United States Patent
Du et al.

(10) Patent No.: US 11,794,758 B2
(45) Date of Patent: Oct. 24, 2023

(54) SELECTIVE HEALTH INFORMATION REPORTING SYSTEMS INCLUDING INTEGRATED DIAGNOSTIC MODELS PROVIDING LEAST AND MOST POSSIBLE CAUSE INFORMATION

(71) Applicant: GM GLOBAL TECHNOLOGY OPERATIONS LLC, Detroit, MI (US)

(72) Inventors: Xinyu Du, Oakland Township, MI (US); Shengbing Jiang, Rochester Hills, MI (US); Yilu Zhang, Northville, MI (US); Varsha K. Sadekar, Detroit, MI (US); Joshua J. Sanchez, Clinton Township, MI (US); Eric J. Baur, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 267 days.

(21) Appl. No.: 17/106,451

(22) Filed: Nov. 30, 2020

(65) Prior Publication Data

US 2022/0169264 A1 Jun. 2, 2022

(51) Int. Cl.
*B60W 50/02* (2012.01)
*B60W 50/14* (2020.01)
(Continued)

(52) U.S. Cl.
CPC ........ *B60W 50/0205* (2013.01); *B60W 50/14* (2013.01); *G06N 5/01* (2023.01);
(Continued)

(58) Field of Classification Search
CPC ............ B60W 50/0205; B60W 50/14; B60W 2556/10; B60W 2556/20;
(Continued)

(56) References Cited

U.S. PATENT DOCUMENTS 8,022,710 B2 9/2011 Ivan et al.
8,352,115 B2 1/2013 Mathieson et al.
(Continued)

OTHER PUBLICATIONS

Wikipedia, Failure mode and effects analysis, Sep. 2020 (Year: 2020).*

(Continued)

*Primary Examiner* — Mahmoud S Ismail
*Assistant Examiner* — Gabriel Anfinrud

(57) ABSTRACT

A first network device includes a transceiver, a memory and a control module. The transceiver receives an integrated model from a second network device that is separate from the first network device. The memory stores the integrated model and diagnostic trouble code data, most probable cause data, and least probable cause data, which have corresponding cause of issue indications for an issue of a vehicle. The control module while executing the integrated model: compares the cause of issue indications to determine whether the cause of issue indications are consistent such that a same cause of issue is indicated; in response to the cause of issue indications being consistent, displays the same cause of issue, and in response to the cause of issue indications being inconsistent and based on a set of conditions, displays a portion of health related information while refraining from displaying another portion of the health related information.

20 Claims, 11 Drawing Sheets

(51) Int. Cl.
  *G07C 5/00* (2006.01)
  *G07C 5/08* (2006.01)
  *G06N 5/01* (2023.01)
(52) U.S. Cl.
  CPC ............ *G07C 5/006* (2013.01); *G07C 5/0825* (2013.01); *B60W 2050/021* (2013.01); *B60W 2050/146* (2013.01); *B60W 2556/10* (2020.02); *B60W 2556/20* (2020.02)
(58) Field of Classification Search
  CPC ...... B60W 2050/021; B60W 2050/146; G06N 5/003; G07C 5/006; G07C 5/0825
  See application file for complete search history.

(56) References Cited

U.S. PATENT DOCUMENTS

| | | |
|---|---|---|
| 2010/0217478 A1 | 8/2010 | Zhang et al. |
| 2010/0299022 A1 | 11/2010 | Jones |
| 2011/0144911 A1 | 6/2011 | Madhavan et al. |
| 2012/0116630 A1* | 5/2012 | Howell ............... G06Q 10/0639 701/31.9 |
| 2018/0082492 A1* | 3/2018 | Stanek ................. G07C 5/0808 |
| 2019/0025813 A1* | 1/2019 | Celia ....................... H04L 67/12 |
| 2020/0372731 A1* | 11/2020 | Holland .............. G07C 5/0808 |
| 2021/0074087 A1* | 3/2021 | Jiang ........................ G07C 5/08 |
| 2022/0165104 A1* | 5/2022 | Gardiner ........ G06Q 10/063112 |
| 2022/0335754 A1* | 10/2022 | Palai ................... B60R 16/0232 |

OTHER PUBLICATIONS

On-Board Diagnostic Trouble Codes for Automotive Technicians Explained, tpcwire.com, Mar. 2018 (Year: 2018).*
U.S. Appl. No. 16/418,587, filed May 21, 2019, Holland et al..
U.S. Appl. No. 16/561,711, filed Sep. 5, 2019, Jiang et al..

\* cited by examiner

SELECTIVE HEALTH INFORMATION REPORTING SYSTEMS INCLUDING INTEGRATED DIAGNOSTIC MODELS PROVIDING LEAST AND MOST POSSIBLE CAUSE INFORMATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle health monitoring, evaluating, reporting and responding systems.

Features are continuously being added to vehicles, such that vehicle systems are becoming more complex. In addition, electronic systems and modules are becoming more interconnected and interdependent making it sometimes difficult to determine the cause of an issue. A technician servicing a vehicle has multiple tools and/or sources of information to review when determining the one or more causes of the issue. The tools may include a service tool for providing diagnostic trouble codes, a multi-meter, and/or other tools. The sources may include failure mode effective analysis (FMEA) documents, design failure mode effective analysis (DFMEA) documents, historical data, current data, verbatim notes from a vehicle operator, etc. The verbatim notes include vehicle operator observations and descriptions of experienced issues.

SUMMARY

A first network device is provided and includes a transceiver, a memory and a control module. The transceiver is configured to receive an integrated model from a second network device, where the second network device is separate from the first network device. The memory is configured to store the integrated model, diagnostic trouble code data, most probable cause data, and least probable cause data, where the diagnostic trouble code data, the most probable cause data, and the least probable cause data have corresponding cause of issue indications for an issue of a vehicle. The control module is configured to execute the integrated model and while executing the integrated model: compares the cause of issue indications corresponding to the diagnostic trouble code data, the most probable cause data, and the least probable cause data to determine whether the cause of issue indications are consistent such that a same cause of issue is indicated; in response to the cause of issue indications being consistent, displays the same cause of issue, and in response to the cause of issue indications being inconsistent and based on a set of conditions, displays a selective portion of health related information while refraining from displaying another selective portion of the health related information.

In other features, the integrated model is at least one of a heuristic model or a machine learning model.

In other features, the control module is configured: determine whether a component has failed; in response to determining the component has not failed, determine whether to display historical data or refrain from displaying a health report of the vehicle; and in response to determining the component has failed, determine whether to display selective health related information or refrain from displaying a health report of the vehicle.

In other features, the control module is configured to: determine whether a non-empty set of most probable cause data and non-empty set of least probable cause data are available; in response to determining that empty set most probable cause data and empty set least probable cause data are available, refrain from displaying a health report; and in response to determining non-empty set most probable cause data and non-empty set least probable cause data are available, display the most probable cause data and the least probable cause data.

In other features, the control module is configured to: determine whether the most probable cause data and the least probable cause data are consistent with at least one of technician observations or technician verbatims; in response to determining that the most probable cause data and the least probable cause data are consistent with the at least one of technician observations or technician verbatims, display the most probable cause data and the least probable cause data; and in response to determining the most probable cause data and the least probable cause data are inconsistent with at least one of technician observations or technician verbatims, display the most probable cause data, the least probable cause data and other health related data.

In other features, the control module is configured to: determine whether historical most probable cause data and historical least probable cause data is available; in response to historical most probable cause data and historical least probable cause data not being available, refrain from displaying a health report; and in response to the historical most probable cause data and the historical least probable cause data being available, determine whether at least one of the historical most probable cause data and the historical least probable cause data are consistent with customer verbatims or no customer verbatims are available.

In other features, the control module is configured to: in response to at least one of the historical most probable cause data and the historical least probable cause data being consistent with customer verbatims or no customer verbatims are available, display trend data; and in response to at least one of the historical most probable cause data and the historical least probable cause data not being consistent with customer verbatims or customer verbatims being available, display the historical most probable cause data and the historical least probable cause data.

In other features, the most probable cause data includes historical and current most probable cause data. The least probable cause data includes historical and current most probable cause data.

In other features, the health related information includes the most probable cause data, the least probable cause data, trend data, system schematic data, and a recommendation for repair.

In other features, the control module is configured to: the transceiver is configured to receive integrated information generated by the vehicle, the second network device or another network device, wherein the integrated information includes a power of greed decision; generate least probable cause decisions based on integrated information; and display least probable cause decision.

In other features, a system is provided and includes the first network device and the second network device. The second network device includes a second transceiver, a second memory and a second control module. The second transceiver is configured to receive the diagnostic trouble code data, the most probable cause data and the least probable cause data from the first network device. The second memory is configured to store, for a vehicle program, the integrated model, failure mode effective analysis data, the diagnostic trouble code data, the most probable cause data, the least probable cause data, vehicle operator verbatim data, and repair actions. The second control module is configured to: at least one of train or update the integrate model based on the failure mode effective analysis data, the diagnostic trouble code data, the most probable cause data, the least probable cause data, the vehicle operator verbatim data, and the repair actions; and subsequent to the at least one of the training or updating of the integrate model, transmit the integrated model to the first network device via the second transceiver.

In other features, the integrated model is at least one of a heuristic model or a machine learning model and configured to report selective service information while excluding other service information based on consistency of cause indications and availability of non-empty set most probable cause data and non-empty set least probable cause data.

In other features, the second control module is configured to at least one train or update the integrate model based on diagnostic trouble code data, most probable cause data, or least probable cause data for another vehicle of the vehicle program.

In other features, the vehicle program refers to a type, model, and year of the vehicle. The diagnostic trouble codes are from a plurality of vehicles manufactured under the vehicle program.

In other features, the second control module is configured to, while at least one of training or updating the integrate model, remove repair actions that did not resolve the issue.

In other features, the second control module is configured to: extract from selective verbatim data and failure mode effective analysis data at least one of a symptom, a root cause, or candidate data of the issue; combine a warranty labor code with the extracted selective verbatim data and failure mode effective analysis data; and at least one of train or update the integrated model based on the combined warranty labor code with the extracted selective verbatim data and failure mode effective analysis data.

In other features, the second control module is configured to: normalize the combined warranty labor code with the extracted selective verbatim data and failure mode effective analysis data; and at least one of train or update the integrated model based on the normalized combined warranty labor code with the extracted selective verbatim data and failure mode effective analysis data.

In other features, the second control module is configured to: divide the normalized combined warranty labor code with the extracted selective verbatim data and failure mode effective analysis data to provide training data, validation data, and test data; train the integrated model based on the training data; determine a hyperparameter of the integrate model based on the validation data; and determine the performance of the integrated model using the test data.

In other features, a service method is provided and includes: receiving an integrated model via a transceiver of a first network device from a second network device; and storing at the first network device the integrated model, diagnostic trouble code data, most probable cause data, and least probable cause data, where the diagnostic trouble code data, the most probable cause data, and the least probable cause data have corresponding cause of issue indications for an issue of a vehicle. The method further includes executing the integrated model and while executing the integrated model: comparing the cause of issue indications and corresponding to the diagnostic trouble code data, the most probable cause data, and the least probable cause data to determine whether the cause of issue indications are consistent such that a same cause of issue is indicated; in response to the cause of issue indications being consistent, displaying the same cause of issue; and in response to the cause of issue indications being inconsistent and based on a set of conditions, displaying a selective portion of health related information while refraining from displaying another selective portion of the health related information.

In other features, the method further includes: receiving at the second network device the diagnostic trouble code data, the most probable cause data and the least probable cause data from the first network device; storing at the second network device, for a vehicle program, the integrated model, failure mode effective analysis data, the diagnostic trouble code data, the most probable cause data, the least probable cause data, vehicle operator verbatim data, and repair actions; at least one of training or updating the integrate model based on the failure mode effective analysis data, the diagnostic trouble code data, the most probable cause data, the least probable cause data, the vehicle operator verbatim data, and the repair actions; and subsequent to the at least one of the training or updating of the integrate model, transmitting the integrated model to the first network device.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
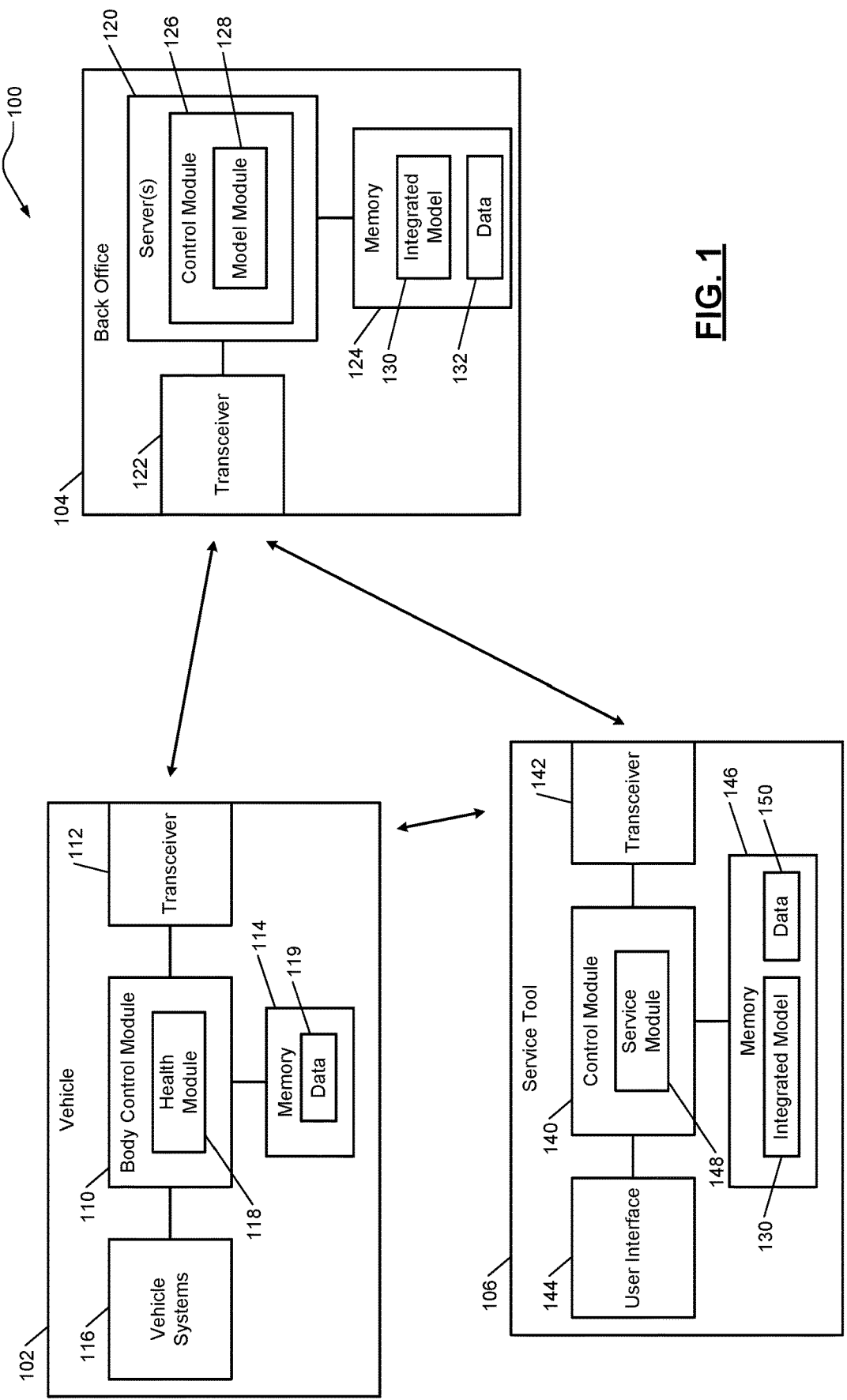
FIG. 1 is a functional block diagram of an example health monitoring system configured to implement an integrated heuristic and/or machine learning model in accordance with the present disclosure.

When a vehicle operator experiences an issue within a vehicle (e.g., the vehicle is having difficulty starting), the vehicle is taken to a service station to have the vehicle serviced and/or repaired. A service technician typically connects the vehicle to a diagnostic service tool to determine if any diagnostic trouble codes (DTCs) have been set. The technician may also review various other collected and/or accessible information such as FMEA documents, DFMEA service manual documents, historical data, current measured data, verbatim notes (hereinafter referred to as verbatims) from the vehicle operator, etc. When certain issues arise, the collected information can be inconsistent and indicate different causes of an issue, especially for intermittent faults. As a result, diagnostic results from different tools and sources can confuse a service technician and result in distrust of service tools, incorrect diagnosis and/or prognosis of the issues, and increased service and warranty costs. Also, if multiple DTCs are set for an issue, this can further increase difficulty in determining the true root cause of the issue.

No trouble found (NTF) rates and customer concern not duplicated (CCND) rates can be high for certain issues. As an example, when a vehicle has difficulty starting, the cause of the issue may be one or more of several items, a bad battery, a bad starter, a bad electronic control module, a bad connection, a bad electronic component, etc. A service technician in reviewing all of the collected information can have difficulty pinpointing the cause of the issue. This may result in the technician incorrectly determining that, for example, the battery is bad when indeed the battery is not bad. As a result, warranty costs and/or customer repair costs increase. When a fault occurs, a service technician that mistrusts the available service tools and/or collected information, may replace a component based on knowledge obtained from past experience. This can also result in replacement of an incorrect component.

As another example, if the issue is intermittent and there is no service tool diagnostic trouble code reported, no in-vehicle fault indicator light illuminated, and no back office indication from a remote active health monitoring system, the technician may incorrectly determine that no fault exists. This leads to the customer needing to pick up the vehicle, wait for the issue to become worse, and return the vehicle back to the service station, which can result in a dissatisfied customer and further increased service and/or warranty costs. As an example, a back office indication may be provided and include a green, yellow or red (GYR) indication of whether an issue exists. The GYR indication may provide a confidence level for a state of health (SOH) of a component. A green designation indicates that the component is operating as expected. A yellow designation indicates that the component is operating with reduced functionality and/or is degraded. A red designation indicates that the component has failed or will fail within a short set period of time.

The examples set forth herein include health monitoring systems including adaptive and integrated diagnostic models and systems indicating to a service technician selective information based on certain conditions. Other selective service and/or health related information is not reported. This is done to minimize and/or prevent confusion in determining a cause of an issue. Multiple different adaptive integrated architectures and methods are disclosed. Examples are provided for handling permanent faults and intermittent faults. Permanent faults refer to faults associated with a failed component. Intermittent faults refer to faults that are sporadically indicated and may be associated with a component that is degraded, a loose connection, and/or other issue for which a fault is not continuously indicated. The systems include use of heuristic and machine learning models and unique graphical user interface screens for quick, clear and easy determination of an issue. The systems allow a service technician to quickly and easily diagnosis and/or prognosis an issue.

Figure 2:
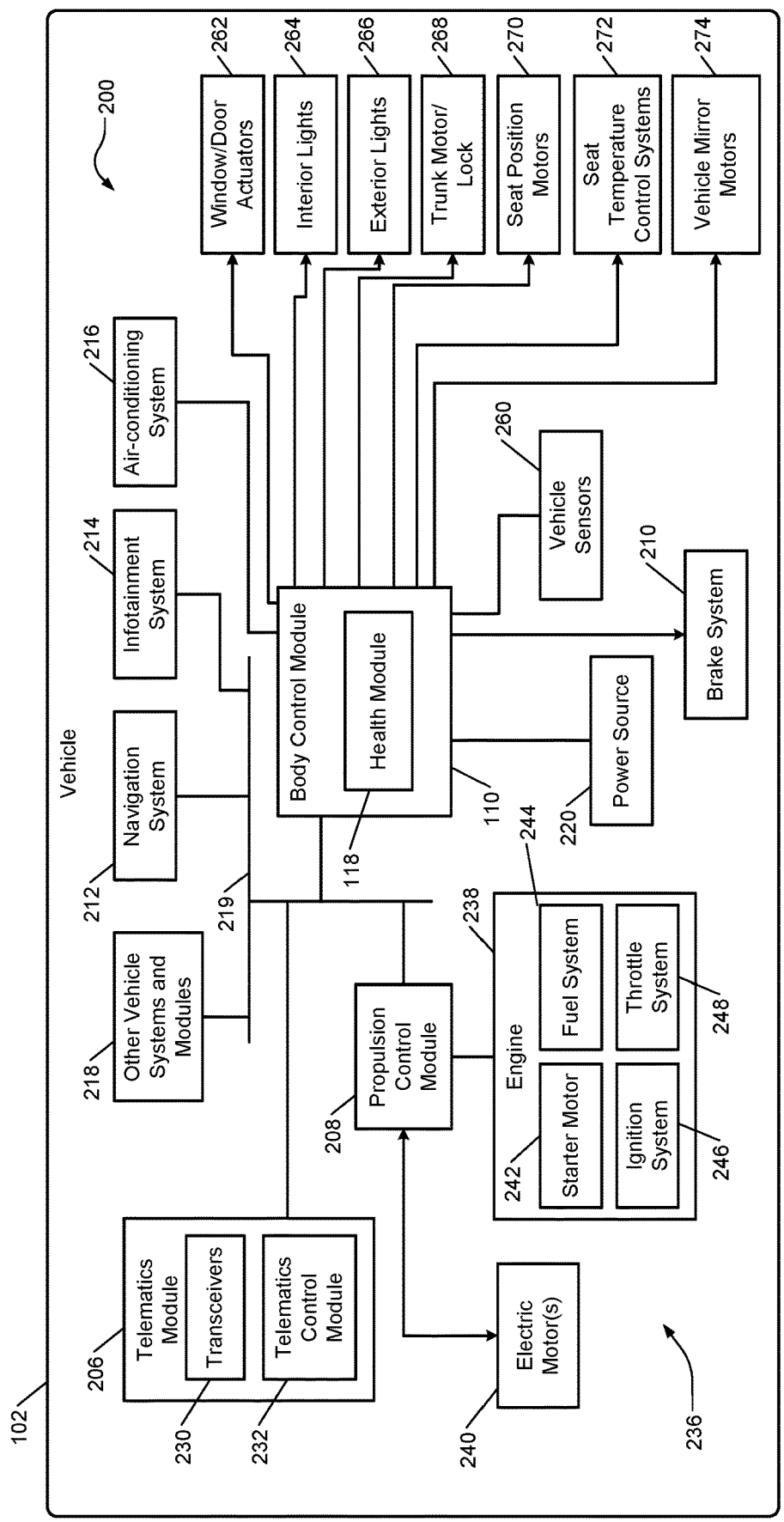
FIG. 2 is a functional block diagram of an example vehicle system including a health module in accordance with the present disclosure.

FIG. 1 shows a health monitoring system 100 configured to implement an integrated heuristic and/or machine learning model. The health monitoring system 100 includes a vehicle 102, a back office 104 and a service tool 106. The vehicle 102 may include a body control module (BCM) 110, a transceiver 112, a memory 114 and vehicle systems 116. The BCM 110 or other control module that hosts the health module 118 may include a health module 118 to indicate health related information to a vehicle operator. The health related information may be indicated via an infotainment system, as shown in FIG. 2. The memory 114 may store various data 119. Example of the vehicle systems 116 are shown in FIG. 2. The data may include health related information, service information, etc. The health related information may include a POG cause indication and related information and system and/or component status information (e.g., state of health, length of service, performance data, etc.).

The back office 104 may be implemented as part of a cloud-based network and include one or more servers 120, a transceiver 122, and a memory 124. The servers 120 may include a control module 126, which may include a model module 128. The model module 128 may create, train, and update an integrated heuristic and/or machine learning model 130 (herein after referred to as the integrated diagnostic model or simply integrated model 130), which is stored along with data 132 in the memory 124. The back office is further described below with respect to FIG. 3.

The service tool 106 may be implemented at a service station and be used as a functional tester when servicing the vehicle 102. The service tool 106 may include a control module 140, a transceiver 142, a user interface 144 and a memory 146. The control module 140 includes a service module 148. The user interface 144 may include a touchscreen and/or a keypad. The memory 146 may store the integrated model 130 and data 150. The service tool 106 may be connected, wirelessly or via one or more wires, to the vehicle 102. The service tool 106 may be used to, for example, obtain, receive and/or generate current DTCs (referred to as DTCs), historical DTCs (HDTCs), current MPCs (referred to as MPCs), current LPCs (referred to as LPCs) and/or other service related information. The data 150 may include the DTCs, HDTCs, MPCs, and LPCs.

In some embodiments, the service tool 106 is implemented at or as part of another network device, such as at or as part of a mobile phone, an in-vehicle device, or a server of a service provider. The service provider and/or the back office 104 may provide a website indicating service and/or health information output by the service tool 106. The website may be accessible by the mobile phone, the in-vehicle device, and/or other network device. A user and and/or technician having access to the mobile phone, the in-vehicle device and/or the other network device may access the website and/or the service and/or health information. The health information may include any of the reported information stated below. The service and/or health information may include any of the service and/or health information disclosed herein. In these embodiments, the service module 148 is implemented in the mobile phone, in the in-vehicle network device, or in the server of the service provider. These embodiments are all applicable to any of the embodiments of FIGS. 1-11 and/or corresponding features described herein.

The control modules 110, 128, 140 may share various health related information. The control modules 126 and 140 share the integrated model 130. The control module 126 may train and/or update the integrated model 130 based on data received from the vehicle 102 and/or the service tool 106.

FIG. 2 shows an example vehicle system 200 of the vehicle 102 of FIG. 1. The vehicle system 200 includes the BCM 110, a telematics module 206, a propulsion control module 208, a brake system 210, a navigation system 212, an infotainment system 214, an air-conditioning system 216, and other vehicle systems and modules 218. The BCM 110 includes the health module 118. The modules and systems 110, 118, 206, 208, 212, 214, 216, 218 may communicate with each other via a controller area network (CAN) bus 219. This communication may include other systems, such as the brake system 210. A power source 220 may be included and power the BCM 110 and other systems, modules, devices and/or components. The power source 220 may include one or more batteries and/or other power sources.

The telematics module 206 may include transceivers 230 and a telematics control module 232. The propulsion control module 208 may control operation of a propulsion system 236 that may include an engine 238 and/or one or more electric motor(s) 240. The engine 238 may include a starter motor 242 (or starter), a fuel system 244, an ignition system 246, and a throttle system 248.

The BCM 110 may control the modules and systems 118, 206, 208, 210, 212, 214, 216, 218 and other devices and systems based on data from sensors 260. The other devices and systems may include window and door actuators 262, interior lights, 264, exterior lights 266, trunk motor and lock 268, seat position motors 270, seat temperature control systems 272, and vehicle mirror motors 274. The sensors 260 may include temperature sensors, pressure sensors, flow rate sensors, position sensors, etc.

The heath module 118 may monitor states of the stated systems, modules, devices and components and indicate health information via, for example, the infotainment system 214, which may include one or more displays, lights, audio system, etc. The health module 118 may report the health information to the control modules 126, 140 of FIG. 1 and/or various status information. The health module 118 may also receive health related information from the control modules 126, 140 and report the health related information to a vehicle operator.

Figure 3:
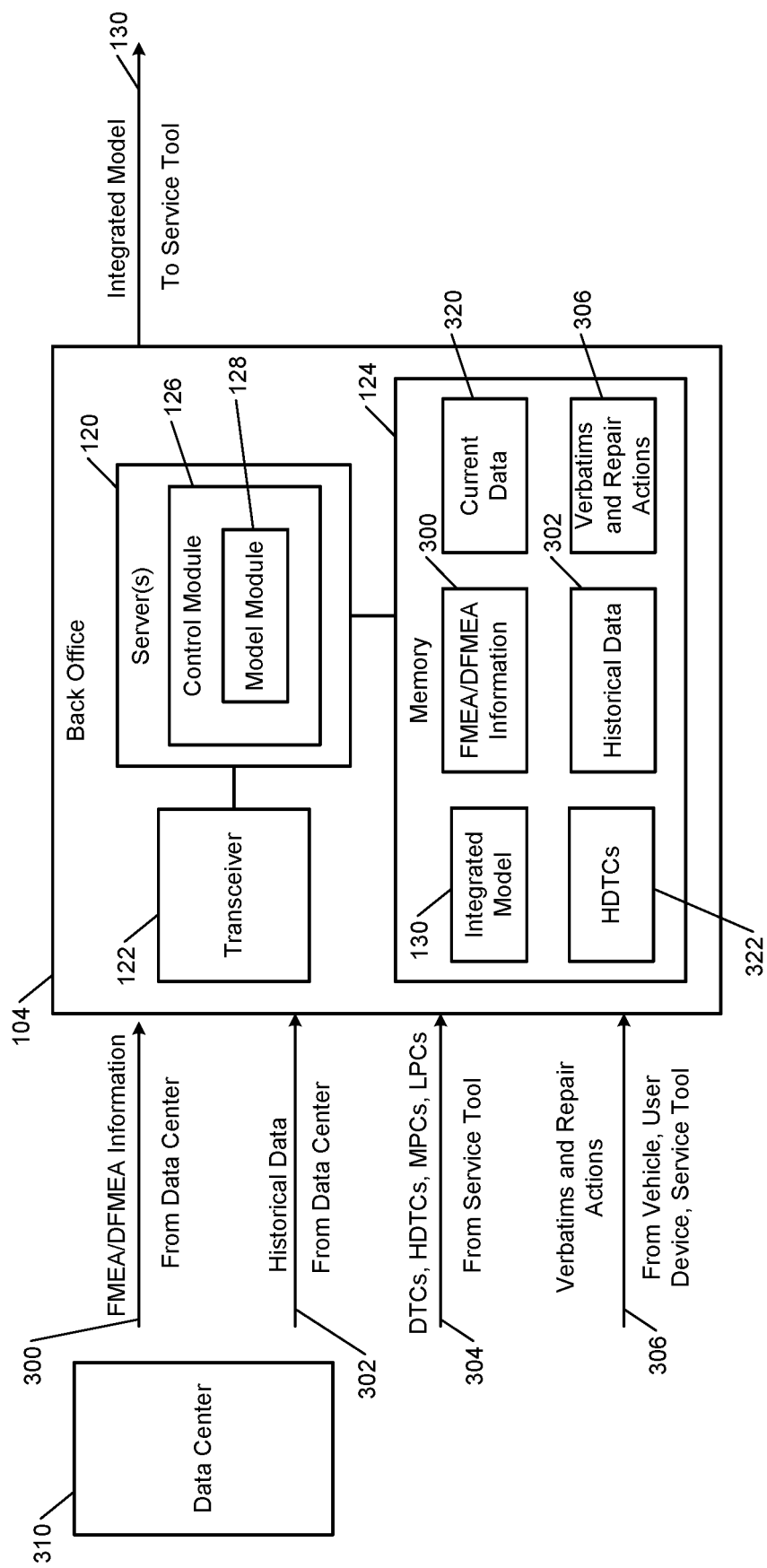
FIG. 3 is a functional block diagram of an example back office in accordance with the present disclosure.

FIG. 3 shows the example back office 104 including the servers 120, the transceiver 122 and the memory 124. The servers 120 include the control module 126 with the model module 128. The model module 128 may receive FMEA and DFMEA information 300, historical data 302, DTCs, HDTCs, MPCs and LPCs 304, verbatims and repair actions 306 and based on this information generate, train, update and provide the integrated model 130. The integrated model 130 may be provided to the service tool 106 of FIG. 1.

The FMEA and DFMEA information 300 of FIG. 3 may include relationships between symptoms and issues. The FMEA and DFMEA information 300 may be received from a remote data center 310. The historical data 302 may include HLPCs and HMPCs that were previously recorded for the current model vehicle (i.e. model of the vehicle 102 of FIG. 1). A different integrated model may be generated for different model vehicles. The historical data 302 may include historical data for the particular vehicle 102 and/or other vehicles of the same model and/or type.

The DTCs, HDTCs, MPCs and LPCs 304 may be received from the service tool 106 of FIG. 1. The DTCs, HDTCs, MPCs and LPCs 304 may also or alternatively be generated at the vehicle 102 and transmitted to the back office 104. The DTCs, HDTCs, MPCs and LPCs 304 may also or alternatively be generated at the back office 104 after processing the original signals collected from the vehicle 102. The verbatims and repair actions 306 of FIG. 3 may include vehicle operator verbatims, service technician verbatims, and actual repair actions performed with corresponding repair action labels identifying the action performed. The memory 124 may store the integrated model 130, the FMEA and DFMEA information 300, the historical data 302, the verbatims and repair actions 306, current data 320 (e.g., the DTCs, MPCs, LPCs) and the HDTCs 322, which may also be referred to as historical data.

The model module 128 is able to adapt the integrated model 130 for each vehicle program, which may refer to a vehicle type, model, year, and/or other vehicle identification information. The model module 128 may implement a neural network, such as a convolutional neural network (CNN) and/or a recurrent neural network (RNN). The model module 128 also or alternatively operate as a support vector machine (SVM). The model module 128 may also or alternatively implement a random forest learning method while training the integrated model 130. The model module 128 may also or alternatively implement a statistical interference method, such as a Bayesian interference method, to update a probability for a hypothesis as data becomes available.

The integrated model 130 once trained is provided to the service tool 106 of FIG. 1. The service tool 106 executes the integrated model 130 to generate health reporting information as further described below.

Figure 4:
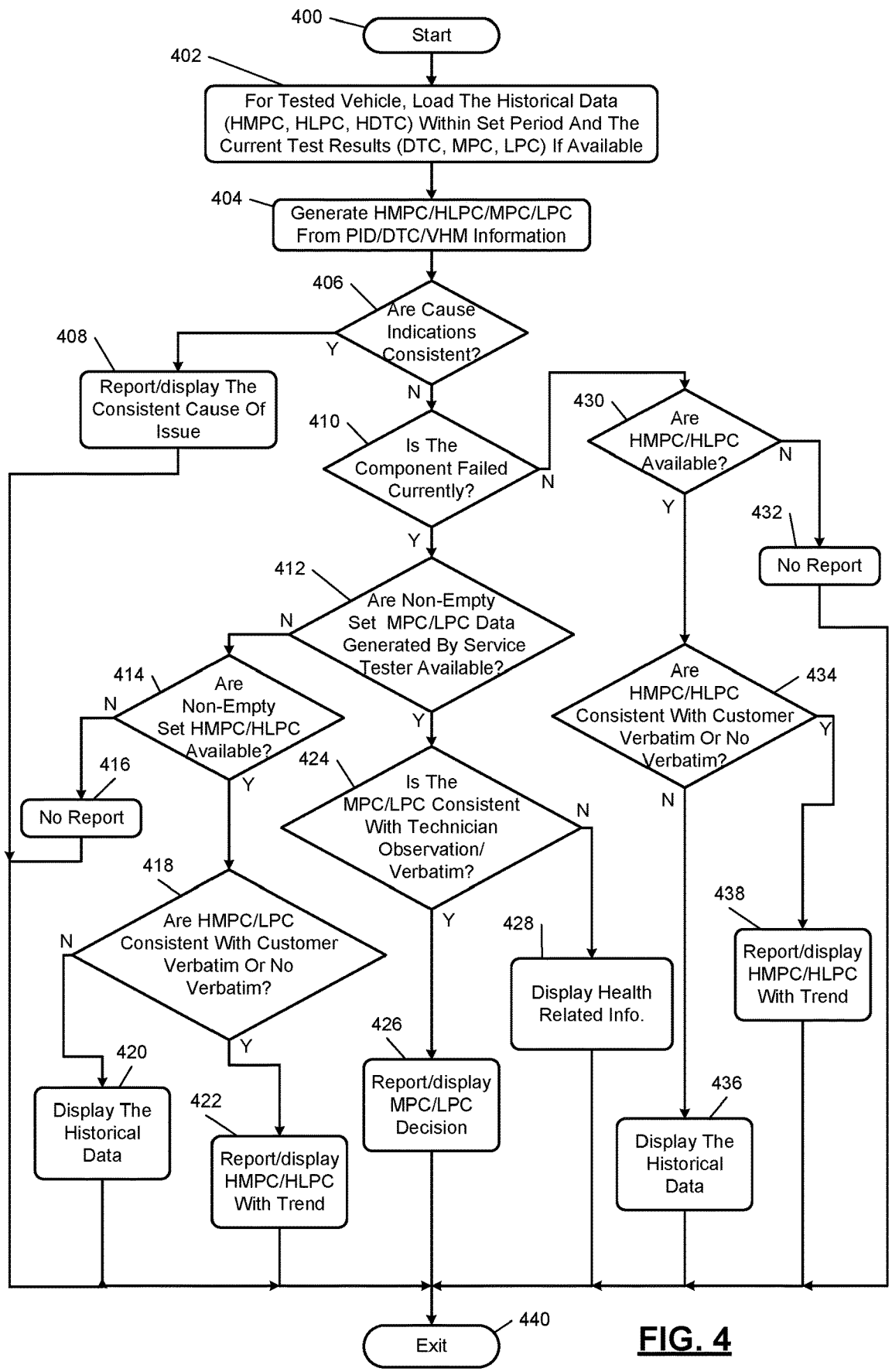
FIG. 4 illustrates a service reporting method implemented using the integrated heuristic and/or machine learning model in accordance with the present disclosure.

FIG. 4 shows a service reporting method implemented using the integrated heuristic and/or machine learning model. The operations of FIG. 4 may be iteratively performed. The method may begin at 400 and may be performed by the service module 148 of the service tool 106. At 402, the service module 148, for a current tested vehicle, loads available historical data (e.g., HMPC, HLPC and HDTC data) into the memory 146.

At 404, the service module 148 may generate MPC and LPC data and may generate HMPC and HLPC data depending on the period of time for which data is generated. The MPC and LPC data may be generated based on parameter identifiers (IDs), DTCs, and vehicle health management (VHM) information. The HMPC, HLPC, MPC and LPC data may include empty set indicators if HMPC, HLPC, MPC and/or LPC data is unable to be generated in the case of insufficient data. The VHM information may include a GYR indication and/or other health related information. The VHM information may be based on continuously assessing over an extended period of time various parameters that indicate a state of health. As an example, a state of charge of a battery, an open circuit voltage, a minimum crank voltage, a crank time, a battery internal resistance, and/or other parameters may be assessed. Problem symptoms (deviations from normal) in the monitored parameters are identified to diagnose and predict failures (e.g., a battery failure). The MPC data, the VHM information, the DTCs, etc. may be referred to or be associated with cause indications (sometimes referred to as decisions) indicating possible, probably and/or unlikely cause(s) of each issue.

At 406, the service module 148 determines whether the loaded and generated data and information is consistent and thus indicates the same cause of an issue. If the loaded and generated data is not consistent, operation 408 is performed, otherwise operation 410 is performed.

At 408, the service module 148 reports and displays the consistent cause of issue indication and a corresponding recommendation to resolve the issue. This may be done via a service tool screen. The service tool screen may be configured similarly as the screens shown in FIGS. 6 and 7, but include different information that shown in FIGS. 6 and 7.

At 410, the service module 148 determines whether a component associated with the cause of issue indication has failed (e.g., is inoperative and/or incapable of performing as intended). If yes, a permanent fault has occurred and operation 412 is performed, otherwise an intermittent fault has occurred and operation 430 is performed.

At 412, the service module 148 determines whether non-empty set MPC and LPC data is available. If not, the service tool 106 and/or integrated model may not be configured to diagnose (or cover) the fault (or issue) and operation 414 is performed, otherwise the service tool 106 and integrated model 130 are configured to diagnose the fault (or issue) and operation 424 is performed.

At 414, the service module 148 determines whether non-empty set HMPC and HLPC data is available. If not, the fault is not covered and operation 416 is performed, otherwise operation 418 is performed. Performance of operation 416 may be referred to as a proactive alert.

At 416, the service module 148 refrains from reporting health related information including refraining from displaying a health report.

At 418, the service module 148 determines at least one of (i) whether HMPC and HLPC data is consistent with customer verbatims, or (ii) if no customer verbatims are available. If neither are true, operation 420 is performed, otherwise operation 422 is performed. At 420, the service module 148 displays the historical data (e.g., the HMPC and HLPC data). At 422, the service module 148 reports and displays the HMPC data, HLPC data and the trend data. As an example, the issue may be a no-start, the integrated model may determine that a fuel pump is the cause for the no-start condition and report the HMPC, HLPC and trend data, which may indicate the fuel pump is at fault.

At 424, the service module 148 determines whether the MPC and LPC data is consistent with technician observations and verbatims. If yes, operation 426 is performed, otherwise operation 428 is performed. At 426, the service module 148 reports and displays MPC and LPC cause of issue indications (or decisions). Continuing with the same example no-start issue, operation 426 may be performed and indicate that the no-start issue is due to a bad battery.

At 428, the service module 148 displays health related information, which may include MPC, LPC, recommendation, DTC, trend data, system schematics, and/or other health related data. The stated information may indicate that the no-start issue is due to a leaky battery. This may be indicated by displaying an MPC, which indicates the most probable cause of the issue is the leaky battery. Leaky battery conditions can be tricky to detect and identify. If operation 424 is not performed, an MPC indication may indicate that the MPC is not the battery, although the battery is leaking. Operation 424 is performed to allow a technician to more easily make this determination.

At 430, the service module 148 determines whether HMPC and HLPC data is available. If no, operation 432 is performed, otherwise operation 434 is performed. At 432, the service module 148 refrains from reporting health related information including refraining from displaying a health report.

At 434, the service module 148 determines at least one of (i) whether the HMPC and HLPC data is consistent with customer verbatims, or (ii) if no verbatims are available. If neither are true, operation 436 is performed, otherwise operation 438 may be performed. At 436, the service module 148 displays the historical data (e.g., the HMPC and HLPC data). At 438, the service module 148 reports and displays the HMPC data, HLPC data and the trend data. Continuing with the same no-start example, the service module 148 may indicate that an intermittent no-start fault has occurred due to a low state of charge on a battery.

The method may end at 440. This may occur subsequent to operations 416, 420, 422, 426, 428, 432, 436, 438.

Figure 5:
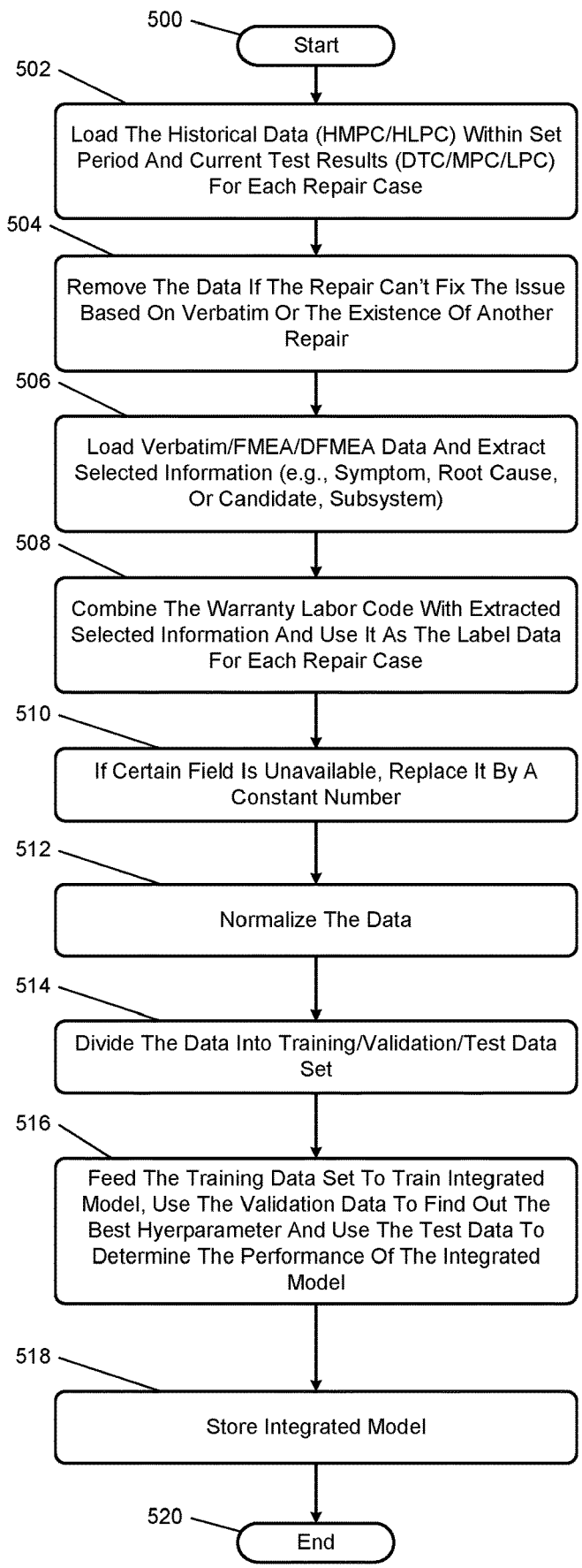
FIG. 5 illustrates an adaptation process for updating the integrated heuristic and/or machine learning model in accordance with the present disclosure.

FIG. 5 shows an adaptation process for updating the integrated heuristic and/or machine learning model 130 of FIG. 1. The model 130 may be a long short-term memory (LSTM) model. The LSTM model is able to handle time series data and make decisions based on current and historical data. The operations of FIG. 5 may be iteratively performed. The method may be performed by the model module 128 of the back office 104 of FIG. 1 and begin at 500.

At 502, the model module 128 loads the historical data which may include the HMPC and HLPC data for a set period of time and current test results, which may include DTCs and MPC and LPC data. This may be done for each repair that was performed on vehicles of a vehicle program. The vehicle program may refer to a type, model, and year of the vehicle, and other vehicle identification information. The historical data and the current data including the MPC data, LPC data and diagnostic trouble codes may be from and/or correspond to multiple vehicles manufactured under the vehicle program.

At 504, the model module 128 removes data associated with a repair that did not fix the issue and/or correct the data to indicate the appropriate repair that does correct the issue. This may be performed based on a verbatim from a vehicle operator and/or a technician. This may also be performed based on a verbatim from a field engineer that is, for example, evaluating a component (e.g., a battery) that has been deemed bad by a technician. The data may also be removed when an additional subsequent repair is performed to correct the same issue that was not resolved by the previously performed repair.

At 506, the model module 128 loads verbatim, FMEA and DFMEA data and extracts selected information, such as symptoms, root causes, and/or candidate subsystem associated with the issue. At 508, the model module 128 combines a warranty labor code with the extracted selected information and uses the combined result as the label data for each repair case. The warranty labor code may refer to a number that indicates what type of repair is performed (e.g., replacing a battery may have a particular warranty labor code).

At 510, the model module 128 replaces any fields the combined result that are unavailable (or are an empty set) with a constant number. The constant number may be zero, a negative number or a high number that distinguishes the number from other actual data. At 512, the model module 128 normalizes the combined resultant data. This may include scaling the data to have values between, for example, 0-1.

At 514, the model module 128 divides the normalized data into training, validation and test data sets.

At 516, the model module 128 provides the training data set as an input to the integrated model 130 of FIG. 1, uses the validation set to find the best hyperparameter, and uses the test data set to determine a performance level of the integrated model. The hyperparameter indicates a best number of layers of the corresponding neural network that provides a best result. Too few or too many layers can result in a worse result. Each layer of the neural network may include weights that are trained during the above-stated training.

At 518, the model module 128 saves the trained resultant integrated model having the selected number of layers in the memory 124. The model may be transmitted to one or more service tools, such as the service tool 106. This may be done as an initial transfer to the service tools or to replace and/or update integrated models already stored at the service tools. The method may end at 520.

Figure 6:
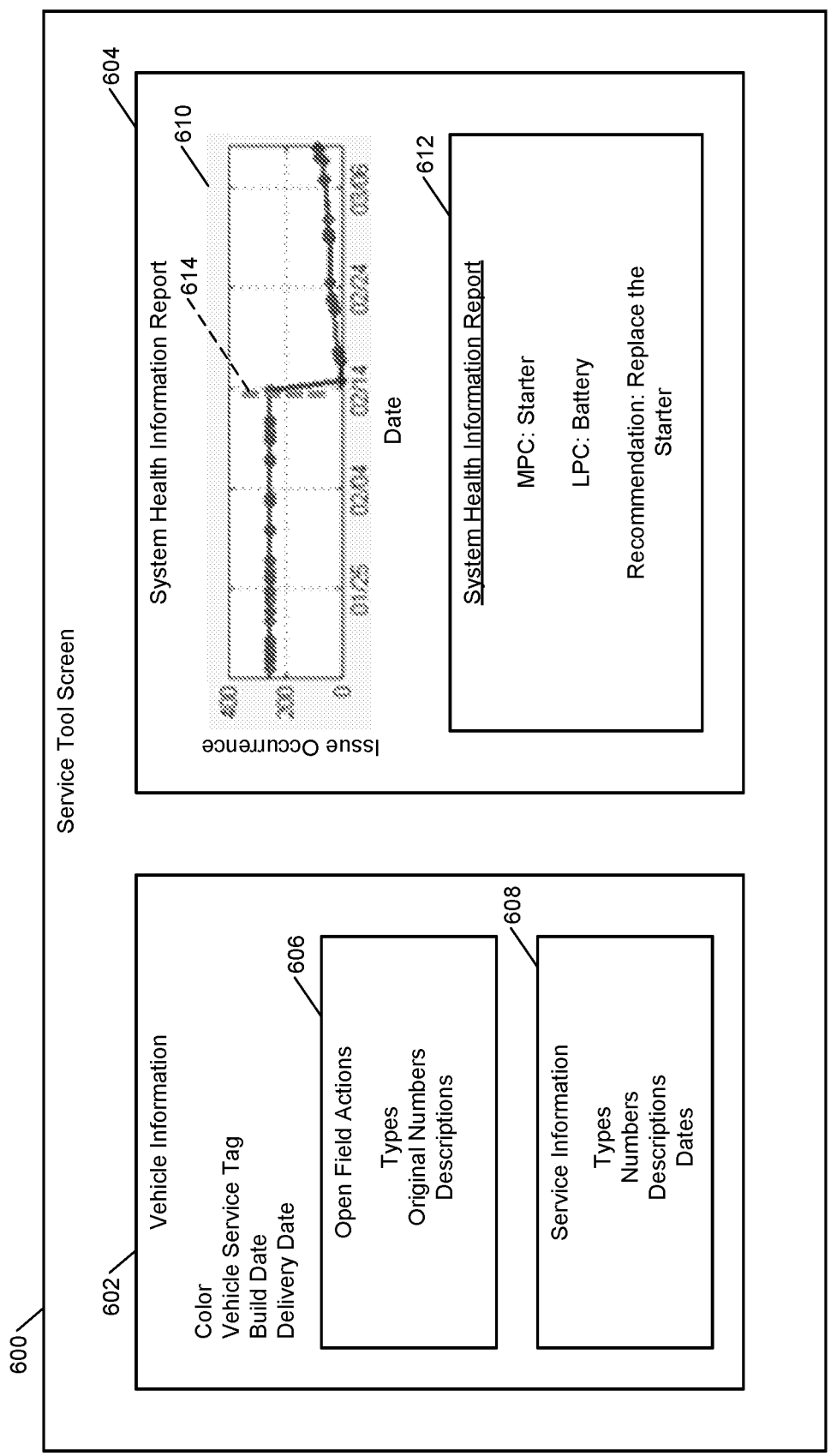
FIG. 6 is an example service tool screen including a trend diagram and a system health information report with most probable cause (MPC) and least probable cause (LPC) information in accordance with the present disclosure.

FIG. 6 shows a service tool screen 600 including a vehicle information window 602 and a system health information report window 604. The example service tool screen 600 is provided as an example for operation 438 of FIG. 4. The vehicle information window 602 may include vehicle information, such as color, a vehicle service tag, build data, delivery data, and other vehicle information. The vehicle information may include open field actions 606 and service information 608. The open field actions 606 may include action types, original numbers, and descriptions. The service information 608 may include service types, numbers, descriptions, dates, etc.

The system health information report window 604 may include a trend diagram 610 and a system health information report 612. The trend diagram 610 may include a historical data trend and/or other trend data associated with an issue over time. The trend diagram 610 may indicate when a customer noticed an issue (e.g., a no-start issue), as shown in the example plot by line 614. The system health information report 612 may indicate a MPC, a LPC, and a recommendation as shown. In the example shown, a no-start occurred and the integrated model is indicating a MPC being the starter, a LPC being the battery, and a recommendation to replace the starter. The integrated model may provide similar information for other issues and causes of the issue. In one embodiment and for intermittent fault cases, the service tool 106 of FIG. 1, of the possible health information to indicate, only shows a correlation and a historical data trend in the system health information report.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

Figure 7:
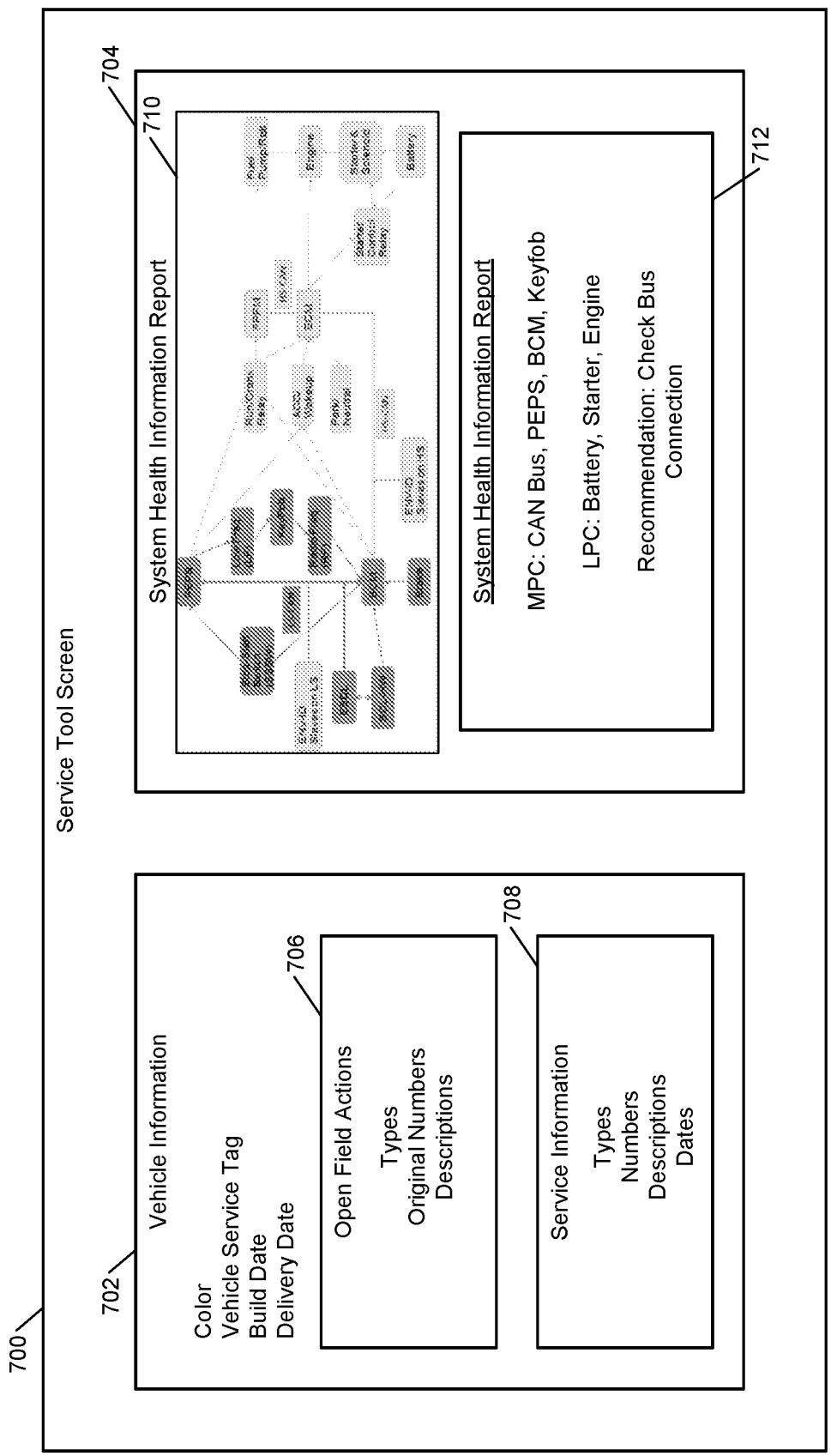
FIG. 7 is an example service tool screen including a system schematic diagram and a system health information report including MPC and LPC information in accordance with the present disclosure.

FIG. 7 shows a service tool screen 700 including a vehicle information window 702 and a system health information report window 704. The example service tool screen 700 is provided as an example for operation 426 of FIG. 4. The vehicle information window 702 may include vehicle information, such as color, a vehicle service tag, build data, delivery data, and other vehicle information. The vehicle information may include open field actions 706 and service information 708. The open field actions 706 may include action types, original numbers, and descriptions. The service information 708 may include service types, numbers, descriptions, dates, etc.

The system health information report window 704 may include a system schematic diagram 710 and a system health information report 712. The system schematic diagram 710 may include blocks identifying modules, devices, components, and corresponding interconnections to illustrate a hierarchical layout and relationships between the modules, devices and components. Different modules, devices and components may be highlighted and/or colored differently to indicate modules, devices and/or components of a particular sub-system and/or that may be associated with a particular issue. The system schematic diagram 710 allows a technician to quickly identify the modules, devices and components that may be involved and/or a cause of an issue. This may be done based on the information in the system health information report. The technician may verify the information in the health information report based on the system schematic diagram 710 and/or the highlighting and/or coloring of the different modules, devices and/or components. The system health information report provided by the system health information report window 704 may indicate a MPC, a LPC, and a recommendation as shown. In the example shown, a no-start occurred and the integrated model is indicating: an MPC being a CAN bus, a passive entry passive start (PEPS) module, a BCM, or a keyfob (or keyfob module); an LPC being the battery, the starter or the engine; and a recommendation to check the bus connection. The integrated model may provide similar information for other issues and causes of the issue. In one embodiment and for permanent fault cases, the service tool 106 of FIG. 1 and out of the possible health information available to indicate, only displays (or reports) current test results and MPC and LPC results from the integrated model. The service tool 106 refrains from displaying other available status and/or health related information.

The above-stated examples include using an adaptive architecture to update the integrate model. A heuristic model is used to integrate different information. A machine learning model is used to generate an integrated result (or decision). FMEA and DFMEA may be used for labeling of symptoms, root causes, and candidates.

Different architectures may be implemented for LPC generation based on current vehicle data, diagnosis and prognosis results, and technician observation and customer verbatims and for display of LPC results to service technician for vehicle repair. Providing LPC information to technicians can help technicians avoid unnecessary repairs. The architectures and corresponding systems involve (i) vehicle onboard and back office data collection and processing, and (ii) service tool integration and display to technicians.

Figure 8:
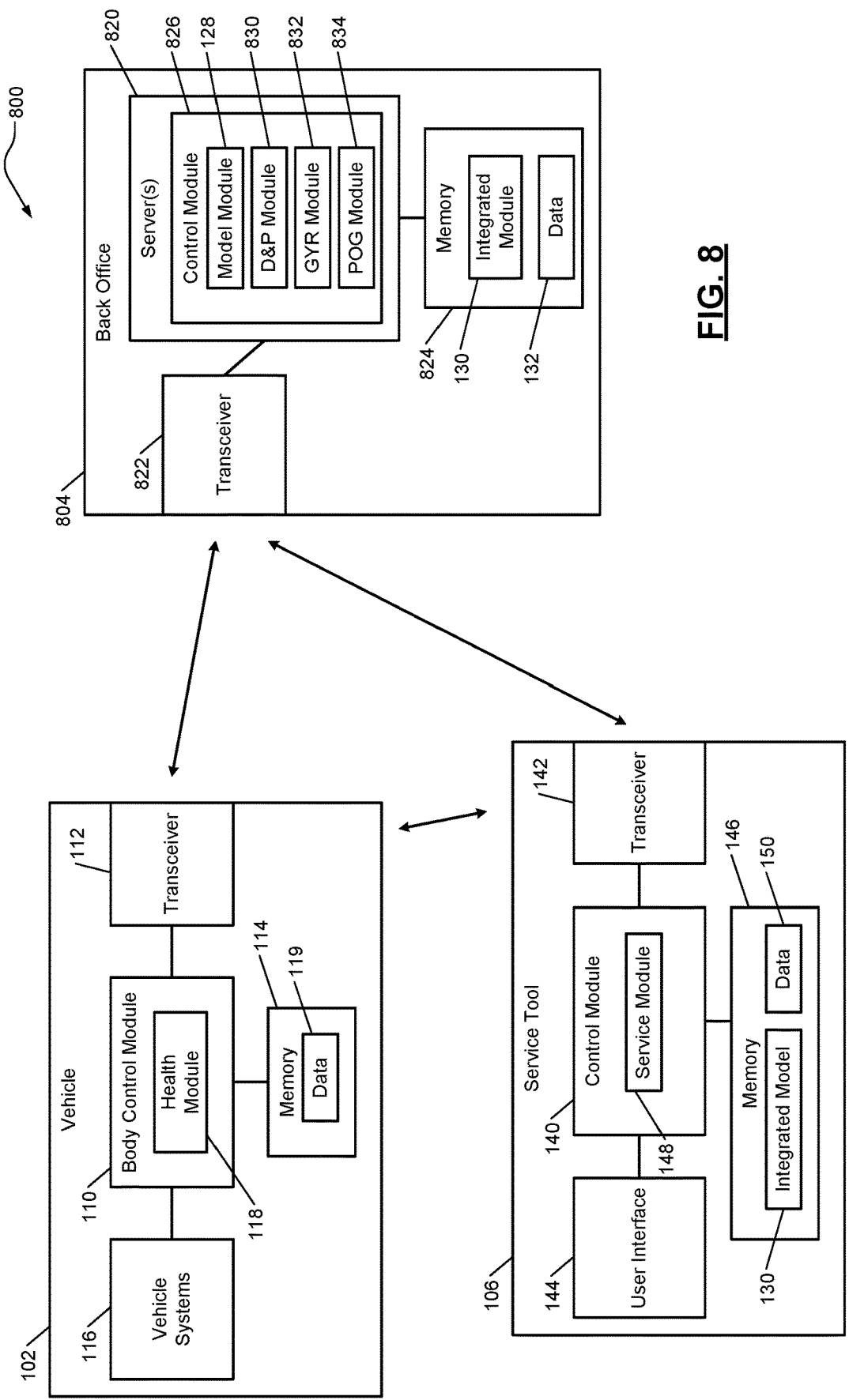
FIG. 8 is a functional block diagram illustrating a first example architecture including integration of current vehicle data at a service tool and integration of power of green (POG) cause indication data at a back office in accordance with the present disclosure.

FIG. 8 shows a first example architecture (or first system) 800 including integration of current vehicle data at a service tool and integration of power of green (POG) cause of issue indication data at a back office. VHM assessments are designed to predict the onset of defined field failure modes. POG decisions are referred to herein and are generated based on VHM information using LPC heuristics. The more consecutive Green assessments from GYR indications for a particular subsystem, module, device and/or component, in a set period of time, the more confident the system is that the subsystem, module, device and/or component are good (i.e. operating normally and/or within normal set parameter operating ranges). Similarly, the more consecutive Yellow and/or Red assessments from GYR indications for a particular subsystem, module, device and/or component, in a set period of time, the more confident the system is that the subsystem, module, device and/or component is bad (i.e. operating abnormally and/or outside the normal set parameter operating ranges).

The first system 800 includes the vehicle 102, a back office 804, and the service tool 106. The vehicle 102 includes the BCM 110, the transceiver 112, the memory 114 and the vehicle systems 116. The BCM 110 includes the health module 118. The health module 118 may perform data collection of onboard systems, modules, devices and components and report the collected data to the back office 804 and/or the service tool 106. The health module 118 may be implemented by a vehicle module, a module of a mobile network device (e.g., a mobile phone), a dongle, and/or other onboard device. The health module 118 may be implemented as an application. In one embodiment, the health module 118 is implemented by an onboard telematics system.

The back office 804 includes one or more servers 820, a transceiver 822, and memory 824. The servers 820 include a control module 826 having the model module 128. The control module 826 may further include a diagnosis and prognosis module 830, a GYR module 832, and a POG module 834. The diagnosis and prognosis module 830 may determine, based on the data received from the health module 118: the cause of an existing issue; predict an issue that is expected to occur in the future; and/or causes of issues predicted to occur. This may be based on historical and currently collected data from one or more vehicles including the vehicle that have the existing issue. The operations performed at the back office 804 may be referred to as cloud computing. The GYR module 832 may provide GYR indications based on the historical and currently collected data. The GYR indications may be based on the diagnosis and prognosis. The GYR indications may be provided as proactive alerts to the vehicle operator by for example signaling the vehicle 102 and/or to a mobile network device of the vehicle operator. The POG module 834 may generate POG decisions and historical data, such as HMPC and HLPC data, based on the GYR indications and/or output of the GYR module 832. The POG decisions may include LPCs and may provide confidence levels for the MPC and LPC decisions made. The memory 824 stores the integrated model 130 and the data 132.

The service tool 106 includes a control module 140, a transceiver 142, a user interface 144 and memory 146. The control module 140 includes a service module 148. The service module 148 may integrate POG decisions, vehicle data, and technician and customer reports and may generate MPC and LPC data (or decisions) based on this integration. The vehicle data may include data collected by the health module 118. This may be done using the integrated model. The MPC and LPC decisions may be provided back to the back office for continued adaptation of the integrated model. The memory 146 stores the integrated model 130 and the data 150.

Figure 9:
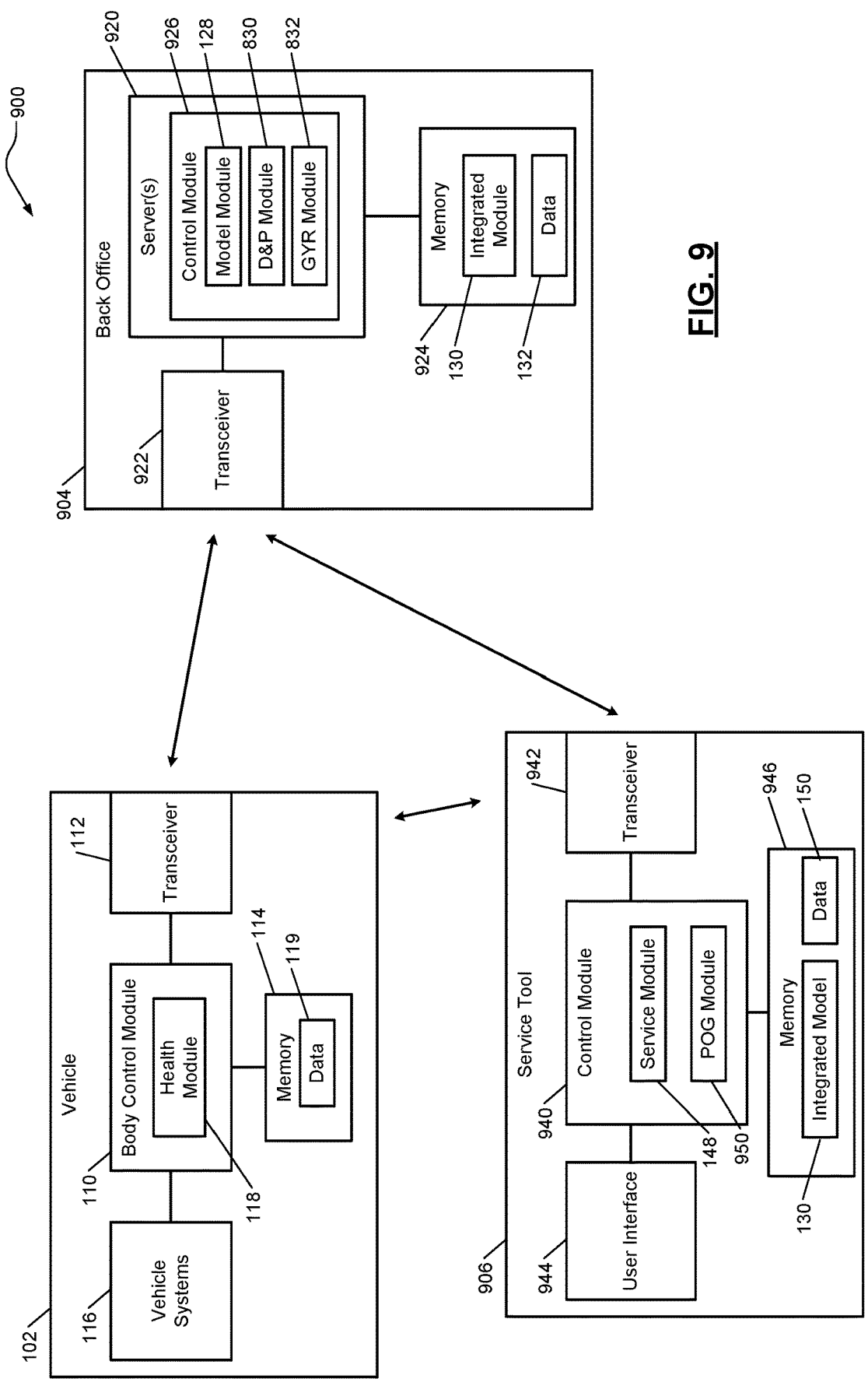
FIG. 9 is a functional block diagram illustrating a second example architecture including integration of current vehicle data and POG cause indication data at the service tool in accordance with the present disclosure.

FIG. 9 shows a second example architecture (or second system) 900 including integration of current vehicle data and POG cause of issue indication data at the service tool. The second system 900 includes the vehicle 102, a back office 904, and a service tool 906. The vehicle 102 includes the BCM 110, the transceiver 112, the memory 114 and the vehicle systems 116. The BCM 110 includes the health module 118.

The back office 904 includes one or more servers 920, a transceiver 922, and memory 924. The servers 920 include a control module 926 having a model module 128. The control module 926 may further include the diagnosis and prognosis module 830 and the GYR module 832. The diagnosis and prognosis module 830 may determine, based on data collected: the cause of an existing issue; predict an issue that is expected to occur in the future; and/or causes of issues predicted to occur. This may be based on historical and currently collected data from one or more vehicles including the vehicle that has the existing issue. The operations performed at the back office 804 may be referred to as cloud computing operations. The GYR module 832 may provide GYR indications based on the historical and currently collected data. The GYR indications may be based on the diagnosis and prognosis. The GYR indications may be provided as proactive alerts to the vehicle operator by for example signaling the vehicle 102 and/or to a mobile network device of the vehicle operator. The memory 924 stores the integrated model 130 and the data 132.

The service tool 906 includes a control module 940, a transceiver 942, a user interface 944 and memory 946. The control module 940 includes the service module 148 and a POG module 950. The POG module 950 may generate POG decisions and historical data, such as HMPC and HLPC data. The POG decisions may include LPCs and may provide confidence levels for the MPC and LPC decisions made.

The service module 148 may integrate the POG decisions, vehicle data, and technician and customer reports and generate MPC and LPC data (or decisions). This may be done using the integrated model. The MPC and LPC decisions may be provided back to the back office for continued adaptation of the integrated model. The memory 946 stores the integrated model 130 and the data 150.

Figure 10:
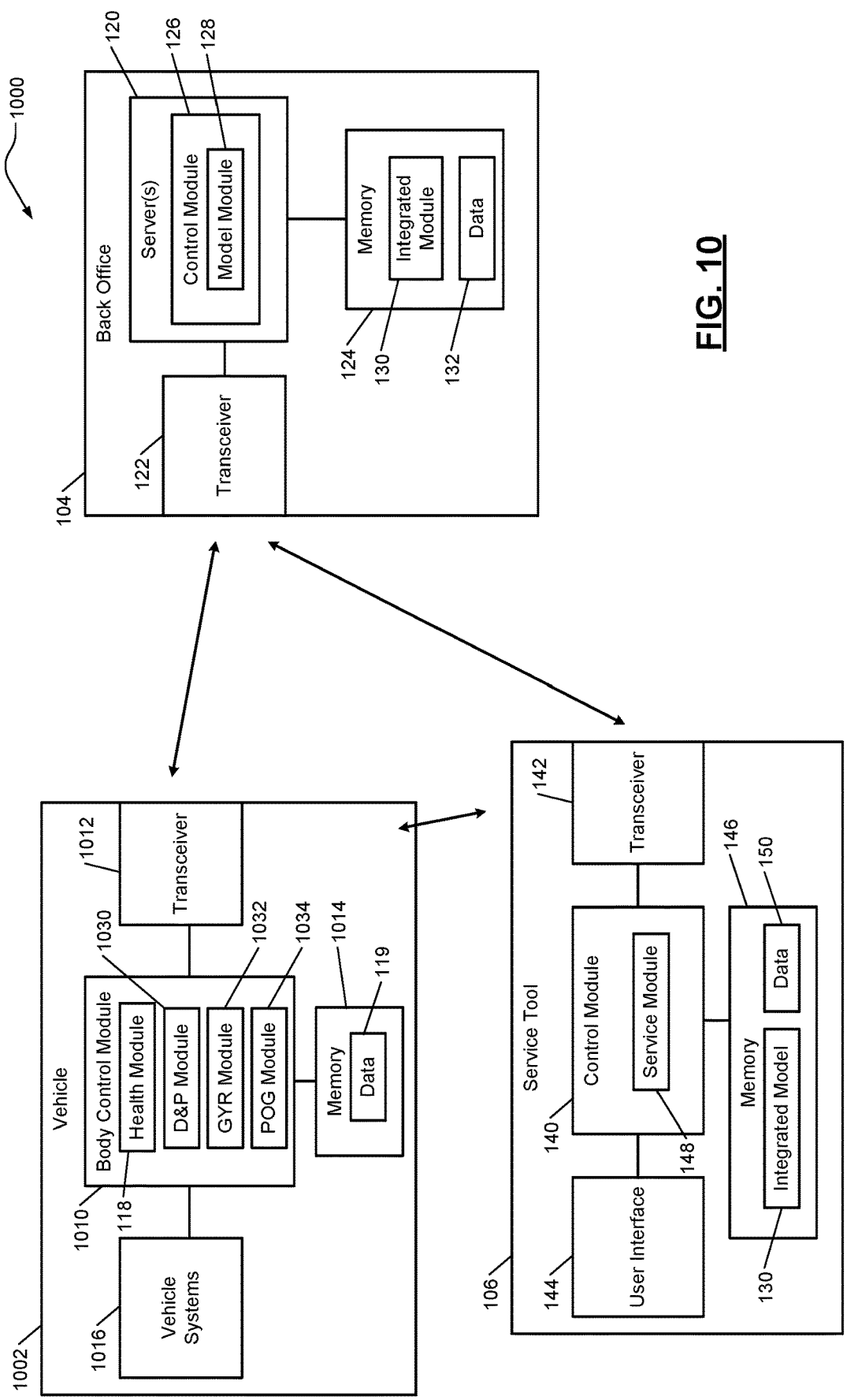
FIG. 10 is a functional block diagram illustrating a third example architecture including integration of current vehicle data at the service tool and integration of POG cause indication data at a vehicle in accordance with the present disclosure.

FIG. 10 shows a third example architecture (or third system) 1000 including integration of current vehicle data at the service tool and integration of POG cause of issue indication data at a vehicle. The third system 1000 includes a vehicle 1002, the back office 104, and the service tool 106. The vehicle 1002 includes a BCM 1010, a transceiver 1012, a memory 1014 and vehicle systems 1016. The BCM 1010 includes the health module 118 and may further include a diagnosis and prognosis module 1030, a GYR module 1032, and a POG module 1034. The diagnosis and prognosis module 1030, GYR module 1032, and POG module 1034 may operate similarly as the diagnosis and prognosis module 830, GYR module 832 and the POG module 834 of FIG. 8. The diagnosis and prognosis module 830 may provide diagnostic and prognostic information based on data collected by the vehicle including status of vehicle systems, modules, devices and components. In an embodiment, the diagnosis and prognosis module 1030, GYR module 1032, and POG module 1034 are implemented using an edge computing device, which may be onboard the vehicle 102 or included in a network device between the vehicle 1002 and the back office 104. The POG module 1034 provides the POG decisions to the service module 148 of the service tool 106.

The back office 104 includes the one or more servers 120, the transceiver 122, and the memory 124. The servers 120 include the control module 126 having the model module 128 and train and update the integrated model 130 as described above. The memory 124 stores the integrated model 130 and the data 132. The service tool 106 includes the control module 140, the transceiver 142, the user interface 144 and the memory 146. The control module 140 includes the service module 148. The service module 148 may receive the POG decision from the POG module 1034 and edge computing device instead of being received from the back office 104. The memory 146 stores the integrated model 130 and the data 150.

Figure 11:
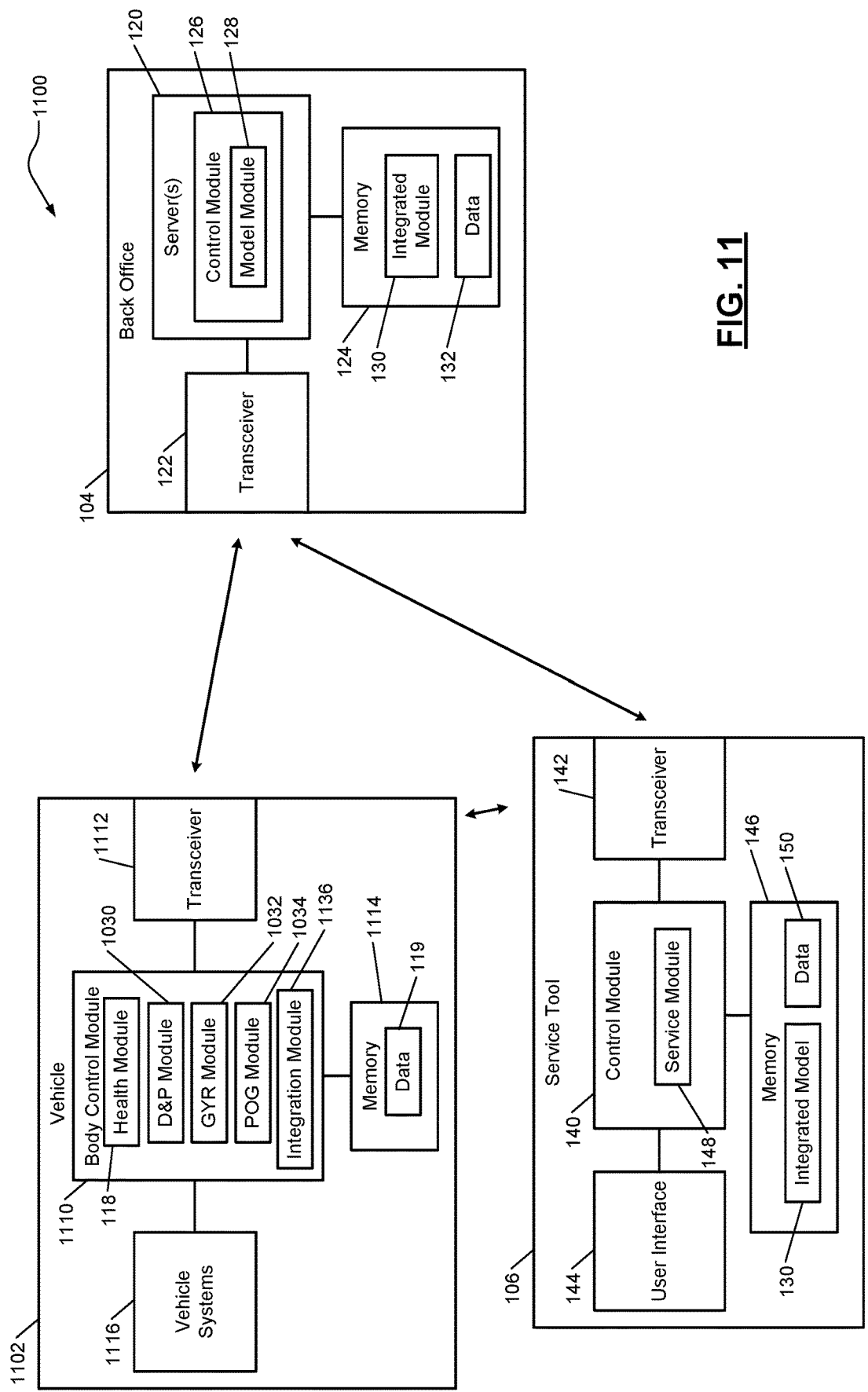
FIG. 11 is a functional block diagram illustrating a fourth example architecture including integration of current vehicle data and POG cause indication data at a vehicle in accordance with the present disclosure.

FIG. 11 shows a fourth example architecture (or fourth system) 1100 including integration of current vehicle data and POG cause of issue indication data at a vehicle. The fourth system 1100 includes a vehicle 1102, the back office 104, and the service tool 106. The vehicle 1102 includes a BCM 1110, a transceiver 1112, a memory 1114 and vehicle systems 1116. The BCM 1010 includes the health module 118 and may further include a diagnosis and prognosis module 1030, a GYR module 1032, and a POG module 1034. The BCM 1110 may also include an integration module 1136. The integration module 1036 may integrate POG decisions, such as LPC decisions with other vehicle data, such as current MPC and LPC data. The other vehicle data may include HMPC and HLPC data.

In an embodiment, the diagnosis and prognosis module 1030, GYR module 1032, POG module 1034 and integration module 1136 are implemented using an edge computing device, which may be onboard the vehicle 102 or included in a network device between the vehicle 1102 and the back office 104. The integration module 1136 provides the combined POG decisions and other vehicle data to the service module 148 of the service tool 106.

The back office 104 includes the one or more servers 120, the transceiver 122, and the memory 124. The servers 120 include the control module 126 having the model module 128 and train and update the integrated model 130 as described above. The memory 124 stores the integrated model 130 and the data 132. The service tool 106 includes the control module 140, the transceiver 142, the user interface 144 and memory 146. The control module 140 includes the service module 148. The service module 148 may receive the combined POG decisions and other vehicle data from the integration module 1136 and edge computing device. The service module 148 integrates technician and customer (or vehicle operator) verbatims/reports and onboard integration results received from the vehicle 1102 and based on this integration provides an LPC decision, which may be shown in a service tool screen. The memory 146 stores the integrated model 130 and the data 150.

The above-described examples include architectures for the implementation of LPC decision generation. This is accomplished via vehicle onboard and back office data collection, diagnosis and prognosis, POG decision generation, and information integration at the vehicle, service tool, and/or back office. Different architecture variants for the implementation of the LPC decision generation are provided. In one embodiment, vehicle onboard data collection and back office POG decision generation occurs based on diagnosis and prognosis results. Service tool information integration occurs based on POG decisions, vehicle data and technician and customer reports.

In another embodiment, vehicle onboard data collection and back office database updating is performed for diagnosis and prognosis results. POG decision generation is provided based on diagnosis and prognosis (D&P) results. The D&P results are used for POG decisions in a service tool. The POG decisions, vehicle data and technician and customer reports are integrated.

In yet another embodiment, vehicle onboard POG decisions are generated based on vehicle onboard D&P decisions. Service tool integration of the POG decisions, vehicle data and technician and customer reports is implemented at the service tool. In another embodiment, vehicle onboard POG decisions are generated based on vehicle onboard D&P decisions. Vehicle onboard information integration is performed and includes integrating the POG decisions and vehicle data. Service tool integration of information includes integrating vehicle onboard results and technician and customer reports. Different service information integrations are described for the different variants.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A first network device comprising:
a transceiver configured to receive an integrated model from a second network device, wherein the second network device is separate from the first network device;
a memory configured to store the integrated model, diagnostic trouble code data, most probable cause data, and least probable cause data, wherein the diagnostic trouble code data, the most probable cause data, and the least probable cause data have corresponding cause of issue indications for an issue of a vehicle; and
a control module configured to execute the integrated model and while executing the integrated model
compares the cause of issue indications of the diagnostic trouble code data, the most probable cause data, and the least probable cause data to determine whether the cause of issue indications of the diagnostic trouble code data, the most probable cause data, and the least probable cause data for a particular issue are consistent such that a certain cause of the particular issue is indicated by collectively the diagnostic trouble code data, the most probable cause data, and the least probable cause data when the most probable cause data indicates a different cause of issue than the least probable cause data,
in response to the cause of issue indications being consistent, displays the certain cause of issue, and
in response to the cause of issue indications being inconsistent and based on a set of conditions, displays a selective portion of health related information while refraining from displaying another selective portion of the health related information.

2. The first network device of claim 1, wherein the integrated model is at least one of a heuristic model or a machine learning model.

3. The first network device of claim 1, wherein the control module is configured:
determine whether a component has failed;
in response to determining the component has not failed, determine whether to display historical data or refrain from displaying a health report of the vehicle; and
in response to determining the component has failed, determine whether to display selective health related information or refrain from displaying a health report of the vehicle.

4. The first network device of claim 1, wherein the control module is configured to:
- determine whether a non-empty set of most probable cause data and non-empty set of least probable cause data are available;
- in response to determining that empty set most probable cause data and empty set least probable cause data are available, refrain from displaying a health report; and
- in response to determining non-empty set most probable cause data and non-empty set least probable cause data are available, display the most probable cause data and the least probable cause data.

5. The first network device of claim 1, wherein the control module is configured to:
- determine whether the most probable cause data and the least probable cause data are consistent with at least one of technician observations or technician verbatims;
- in response to determining that the most probable cause data and the least probable cause data are consistent with the at least one of technician observations or technician verbatims, display the most probable cause data and the least probable cause data; and
- in response to determining the most probable cause data and the least probable cause data are inconsistent with at least one of technician observations or technician verbatims, display the most probable cause data, the least probable cause data and other health related data.

6. The first network device of claim 1, wherein:
- the most probable cause data includes historical most probable cause data and current most probable cause data; and
- the least probable cause data includes historical least probable cause data and current least probable cause data.

7. The first network device of claim 1, wherein the health related information includes the most probable cause data, the least probable cause data, trend data, system schematic data, and a recommendation for repair.

8. The first network device of claim 1, wherein the control module is configured to:
- the transceiver is configured to receive integrated information generated by the vehicle, the second network device or another network device, wherein the integrated information includes a power of green decision;
- generate least probable cause decisions based on integrated information; and
- display least probable cause decision.

9. A system comprising
the first network device of claim 1; and
the second network device comprising
- a second transceiver configured to receive the diagnostic trouble code data, the most probable cause data and the least probable cause data from the first network device,
- a second memory configured to store, for a vehicle program, the integrated model, failure mode effective analysis data, the diagnostic trouble code data, the most probable cause data, the least probable cause data, vehicle operator verbatim data, and repair actions, and
- a second control module configured to
  - at least one of train the integrated model or update the integrated model based on the failure mode effective analysis data, the diagnostic trouble code data, the most probable cause data, the least probable cause data, the vehicle operator verbatim data, and the repair actions, and
  - subsequent to the at least one of the training of the integrated model or the updating of the integrated model, transmit the integrated model to the first network device via the second transceiver.

10. The system of claim 9, wherein the integrated model is at least one of a heuristic model or a machine learning model and configured to report selective service information while excluding other service information based on consistency of cause indications and availability of non-empty set most probable cause data and non-empty set least probable cause data.

11. The system of claim 9, wherein the second control module is configured to at least one train the integrated model or update the integrated model based on diagnostic trouble code data, most probable cause data, or least probable cause data for another vehicle of the vehicle program.

12. The system of claim 9, wherein:
- the vehicle program refers to a type, model, and year of the vehicle; and
- the diagnostic trouble code data is from a plurality of vehicles manufactured under the vehicle program.

13. The system of claim 9, wherein the second control module is configured to, while at least one of training the integrated model or updating the integrated model, remove repair actions that did not resolve the issue.

14. The system of claim 9, wherein the second control module is configured to:
- extract from selective verbatim data and failure mode effective analysis data at least one of a symptom, a root cause, or candidate data of the issue;
- combine a warranty labor code with the extracted selective verbatim data and failure mode effective analysis data; and
- at least one of train the integrated model or update the integrated model based on the combined warranty labor code with the extracted selective verbatim data and failure mode effective analysis data.

15. The system of claim 14, wherein the second control module is configured to:
- normalize the combined warranty labor code with the extracted selective verbatim data and failure mode effective analysis data; and
- at least one of train the integrated model or update the integrated model based on the normalized combined warranty labor code with the extracted selective verbatim data and failure mode effective analysis data.

16. The system of claim 15, wherein the second control module is configured to:
- divide the normalized combined warranty labor code with the extracted selective verbatim data and failure mode effective analysis data to provide training data, validation data, and test data;
- train the integrated model based on the training data;
- determine a hyperparameter of the integrated model based on the validation data; and
- determine the performance of the integrated model using the test data.

17. A first network device comprising:
- a transceiver configured to receive an integrated model from a second network device, wherein the second network device is separate from the first network device;
- a memory configured to store the integrated model, diagnostic trouble code data, most probable cause data, and least probable cause data, wherein the diagnostic trouble code data, the most probable cause data, and the least probable cause data have corresponding cause of issue indications for an issue of a vehicle; and a control module configured to execute the integrated model and while executing the integrated model compares the cause of issue indications respectively of the diagnostic trouble code data, the most probable cause data, and the least probable cause data to determine whether the cause of issue indications are consistent such that a certain cause of issue is indicated, in response to the cause of issue indications being consistent, displays the certain cause of issue, and in response to the cause of issue indications being inconsistent and based on a set of conditions, displays a selective portion of health related information while refraining from displaying another selective portion of the health related information, wherein the control module is configured to:

determine whether historical most probable cause data and historical least probable cause data is available, in response to historical most probable cause data and historical least probable cause data not being available, refrain from displaying a health report, and in response to the historical most probable cause data and the historical least probable cause data being available, determine whether at least one of the historical most probable cause data and the historical least probable cause data are consistent with customer verbatims or no customer verbatims are available.

18. The first network device of claim 17, wherein the control module is configured to:

in response to at least one of the historical most probable cause data and the historical least probable cause data being consistent with customer verbatims or no customer verbatims are available, display trend data; and in response to at least one of the historical most probable cause data and the historical least probable cause data not being consistent with customer verbatims or customer verbatims being available, display the historical most probable cause data and the historical least probable cause data.

19. A service method comprising:

receiving an integrated model via a transceiver of a first network device from a second network device;

storing at the first network device the integrated model, diagnostic trouble code data, most probable cause data, and least probable cause data, wherein the diagnostic trouble code data, the most probable cause data, and the least probable cause data have corresponding cause of issue indications for an issue of a vehicle; and executing the integrated model, and while executing the integrated model comparing the cause of issue indications of the diagnostic trouble code data, the most probable cause data, and the least probable cause data to determine whether the cause of issue indications of the diagnostic trouble code data, the most probable cause data, and the least probable cause data for a particular issue are consistent such that a certain cause of the particular issue is indicated by collectively the diagnostic trouble code data, the most probable cause data, and the least probable cause data when the most probable cause data indicates a different cause of issue than the least probable cause data, in response to the cause of issue indications being consistent, displaying the certain cause of issue, and in response to the cause of issue indications being inconsistent and based on a set of conditions, displaying a selective portion of health related information while refraining from displaying another selective portion of the health related information.

20. The method of claim 19, further comprising:

receiving at the second network device the diagnostic trouble code data, the most probable cause data and the least probable cause data from the first network device;

storing at the second network device, for a vehicle program, the integrated model, failure mode effective analysis data, the diagnostic trouble code data, the most probable cause data, the least probable cause data, vehicle operator verbatim data, and repair actions;

at least one of training the integrated model or updating the integrated model based on the failure mode effective analysis data, the diagnostic trouble code data, the most probable cause data, the least probable cause data, the vehicle operator verbatim data, and the repair actions; and subsequent to the at least one of the training of the integrated model or the updating of the integrated model, transmitting the integrated model to the first network device.

* * * * *